July 14, 1942.　　W. H. ROWAND ET AL　　2,289,970
STEAM AND WATER SEPARATOR
Filed May 27, 1938　　3 Sheets-Sheet 1

INVENTORS
Will H. Rowand &
James Fletcher
ATTORNEY.

July 14, 1942.  W. H. ROWAND ET AL  2,289,970
STEAM AND WATER SEPARATOR
Filed May 27, 1938  3 Sheets-Sheet 2
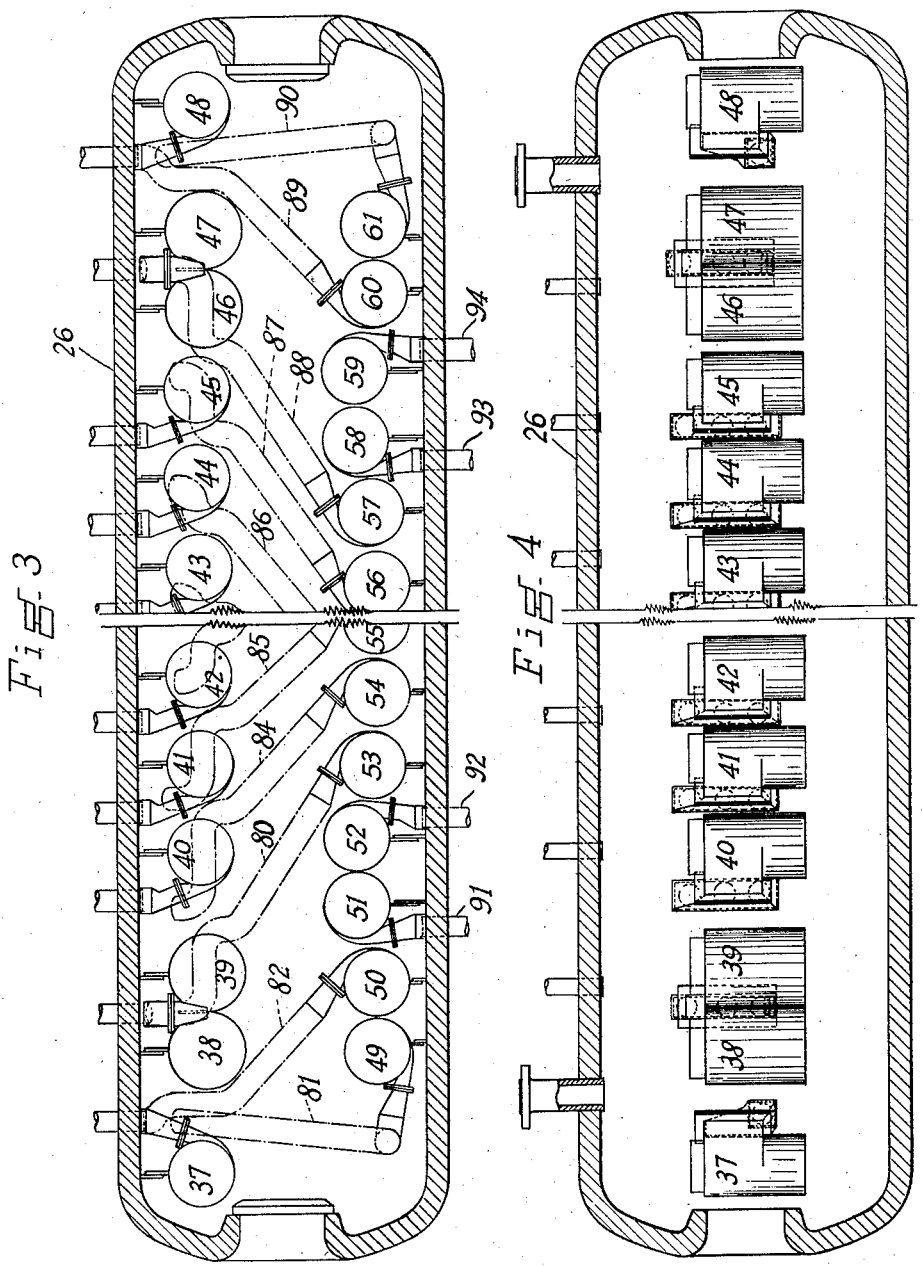
INVENTORS
Will H. Rowand &
James Fletcher
BY
ATTORNEY.

July 14, 1942. W. H. ROWAND ET AL 2,289,970
STEAM AND WATER SEPARATOR
Filed May 27, 1938 3 Sheets-Sheet 3
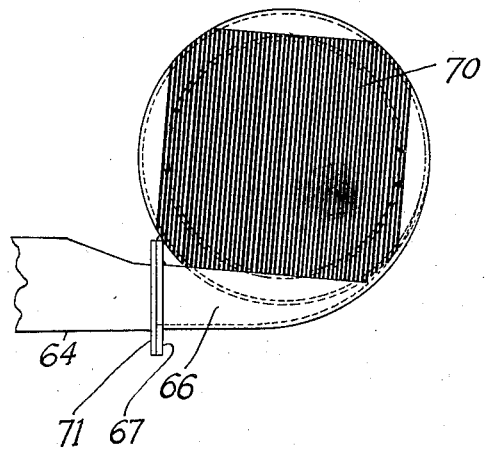
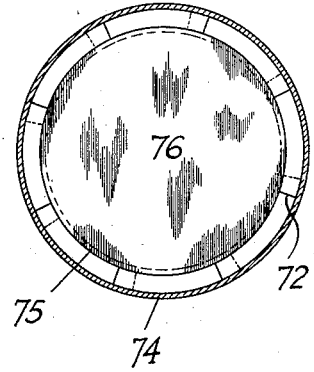
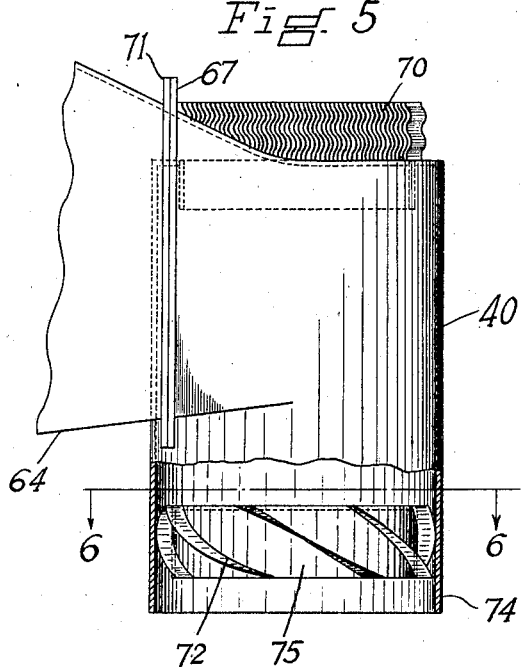
INVENTORS
Will H. Rowand &
James Fletcher
BY
ATTORNEY.

Patented July 14, 1942

2,289,970

UNITED STATES PATENT OFFICE 2,289,970

STEAM AND WATER SEPARATOR

Will H. Rowand, Jersey City, N. J., and James Fletcher, Akron, Ohio, assignors to The Babcock & Wilcox Company, Newark, N. J., a corporation of New Jersey Application May 27, 1938, Serial No. 210,374

9 Claims. (Cl. 122—488)

This invention relates to fluid heat exchange apparatus, and it is exemplified in improvements in water tube steam boilers whereby the safe steaming capacities of such boilers are increased.

In recent steam boiler developments, progressively greater efficiencies have been attained by the utilization of higher operating pressures. Progressively higher rates of steam generation have also been a factor in the development of the art. Both factors have emphasized the necessity of securing efficient steam and water separation without increasing the steam and water separating space in the drums. If this space were increased in accordance with prior art teachings, greater drum diameters would be necessary, and, for the pertinent high pressures (of the order of 1000–2000 lbs. per sq. inch), the provision of drums of the necessarily greater diameters would result in excessive increases in drum wall thickness. They would be excessive from many standpoints, including the standpoint of manufacturing limitations and the standpoint of cost limitations. The present invention provides improvements which effect a safe degree of steam and water separation at high pressures and high capacity operation without necessitating drums of excessive diameter.

The high capacities of modern steam boilers have also made it particularly difficult to insure continuous supply of dry steam without excessive drum capacity. The high heat input into the furnace wall tubes under such high capacity conditions causes those tubes to produce high velocity discharges of steam and water into the drum, and the natural tendency of this condition is to keep the steam and water mixed within the drum. Furthermore, the necessity of providing adequate ligaments in the drum prevents the concentration of the drum connections for such furnace wall tubes. They must be distributed over wide drum areas. This also has an additional tendency to produce high drum turbulence and make steam and water separation increasingly difficult. The present invention overcomes these difficulties, and, in so doing, utilizes the high velocity of the discharges into the drum to promote steam and water separation and render a given boiler capable of supplying dry steam while operating at water levels higher than would otherwise be permissible. It also so utilizes these high velocities that they prevent fluctuating high water levels from interfering with the steam and water separation effected at positions at or below such water levels.

The invention also involves a high pressure boiler drum containing a plurality of primary stage separators which operate independently with each of the separators independently connected to one or more circulators discharging steam and water mixtures at high velocities and high pressures into the drum. With this arrangement the separators may be of lightweight construction because they need withstand only small differences in pressure. No additional tube seat openings in the drum are necessary, and the separators are effective in such sizes that they can be installed within the drum without making access thereto difficult. Furthermore, the installation of the illustrative separators in a drum does not substantially detract from the effective steam and water separation space of the drum.

The use of the illustrative separators in a steam and water drum is characterized by the fact that high velocity of steam and water mixture discharges into the drum is not dissipated, but is retained and utilized to accomplish desirable results without adding any appreciable resistance. Each separator may be arranged to receive the combined discharge of several heating tubes, and yet be so arranged and constructed that it may be easily removed from its operative position for inspection, or cleaning of the tubes.

The invention also involves the division of the function of vapor and liquid separation into a plurality of stages in the first of which centrifugal separation takes place in a plurality of high velocity cylindrical chambers arranged with their axes in vertical planes. In a subsequent stage relatively low velocity separation takes place in a large volume cylindrical chamber arranged with its longitudinal axis in a horizontal plane.

Other attributes and objects of the invention will appear as the following description proceeds. The invention will be described with reference to the accompanying drawings in which an illustrative embodiment of the invention is disclosed.

In the drawings:

Fig. 1 of the drawings is a vertical section of a water tube steam boiler embodying the invention;

Fig. 3 is a horizontal section through the boiler drum. This view is also in the nature of a plan, with respect to the arrangement of separators within the drum;

Fig. 4 is a vertical longitudinal section of the steam and water drum showing some of the illustrative separators in elevation;

Fig. 5 is a detailed view of one of the separators. This view shows part of the separator in side elevation, and the lower part of the separator has its outer wall broken away so as to expose the inner construction;

Fig. 6 is a horizontal section of the separator shown in Fig. 5. This view is taken on the section-line 6—6 of Fig. 5, looking in the direction of the arrows; and Fig. 7 is a plan of the Fig. 5 separator. This view shows the arrangement of the parts of a multiple plate steam and water separator disposed at the upper part of the centrifugal separator.

Figure 1:
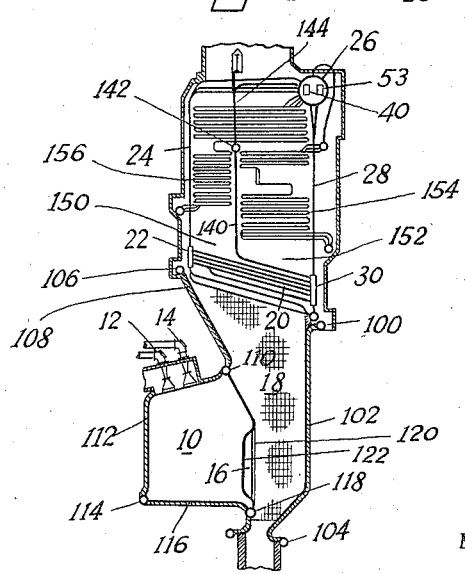

The Fig. 1 boiler involves a two-stage furnace. The primary stage 10 is fired by burners 12 and 14 and furnace gases pass from that stage through the outlet 16 into the secondary stage 18. The walls of both stages are preferably defined by steam generating tubes, or wall cooling tubes, at least some of which are connected into the boiler circulation.

From the second stage 18 the furnace gases pass upwardly across inclined steam generating tubes 20, the upper ends of which are connected by the headers 22 and the circulators 24 to the steam and water drum 26. Because of steam generation resulting from the high temperature of the furnace gases the circulators 24 discharge steam and water into the drum 26 at high velocity. In the drum 26 the steam is separated from the water, the latter returning to the inlets of the steam generating tubes 20 through the agency of the downcomers 28. These are shown to be connected at their lower ends to the downtake headers 30.

The steam and water separators within the drum include the multiple plate separators 32 and 34 which may extend throughout a considerable portion of the length of the drum. Beneath the multiple plate separator 32, there is a row of centrifugal separators. These are indicated in Fig. 3 as the separators 37–48, inc. On the opposite side of the drum and beneath the multiple plate separator 34 there is another row of separators which is indicated in Fig. 3 as including the separators 49–61, inc.

Figure 2:
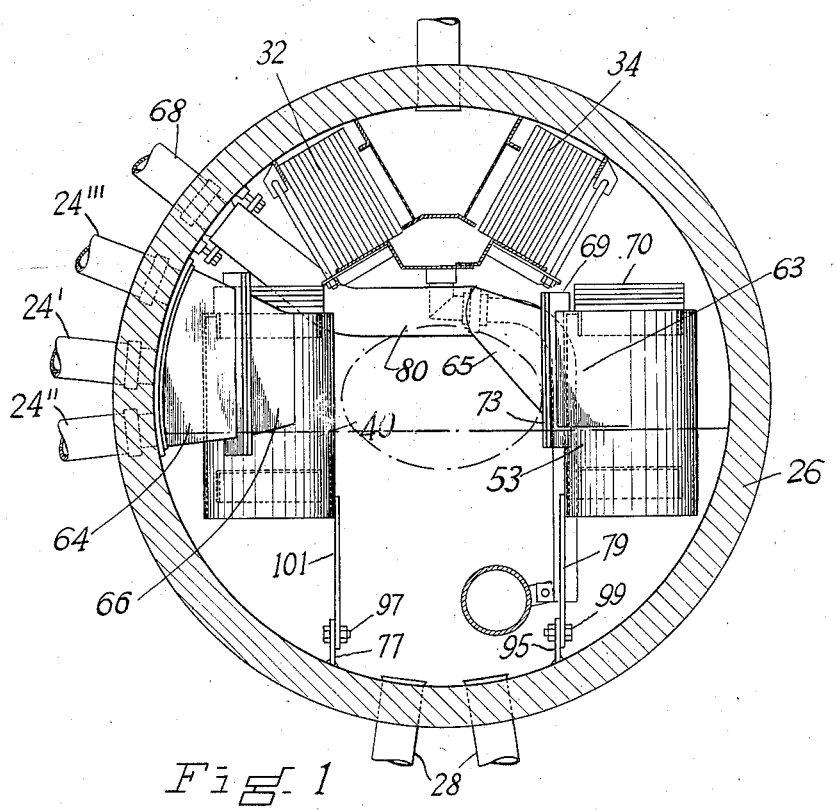
Fig. 2 is a vertical section of the steam and water drum of the boiler shown in Fig. 1.

Fig. 2 of the drawings shows the circulators 24', 24", and 24''' communicating with the separator inlet sections 64 and 66 which are arranged to deliver the combined discharge of those circulators tangentially to the circular whirl chamber of the separator 40. The relation of the inlet section 66 to the whirl chamber may be considered as indicated in Fig. 7 of the drawings.

The discharge of the steam and water mixture from the circulators into the whirl chamber of the separator sets up a circular motion of the fluid within that chamber, developing a high pressure at the perimeter of the chamber. The water is separated from the steam which is discharged from the separator upwardly through the corrugated plate separator 70 toward the separator 32. The steam is thus discharged axially from the whirl chamber.

From the zone of higher pressure around the perimeter of the whirl chamber the separated water is discharged downwardly and outwardly of the separator by reason of the vanes 72 which are located in an annular passage between the shell 74 of the separator and the circular wall 75 extending downwardly from the plate 76 forming the imperforate bottom of the central portion of the separator. The separated water is thus discharged downwardly in substantially confined streams and at such high velocity that the boiler may operate under high water level conditions and yet supply dry steam. The velocity of the separated water discharging from the separator will prevent water from entering the separator from the body of water within the drum and thus interfering with the separating action.

The separator 53 is shown in Fig. 2 of the drawings as being connected with the outlet end of the circulator 68 by the cross-over tube 80, Fig. 3 of the drawings showing a number of other similar cross-over tubes 81–90, inc. In each case, the construction and operation of the separator is substantially the same as that above described, the mixture of steam and water discharging into the whirl chamber of the separator at high velocity.

All of the individual separators are provided with tangential inlet structures somewhat similar to the inlet section 66 of the separator shown in Figs. 2, 5, and 7 of the drawings. The separator 53, also shown in Fig. 2 of the drawings, has inlet sections 63 and 65, (similar to 64 and 66) the latter of which is connected with the cross-over tube 80. The tangential inlet sections 63 and 66 are integral with the separators 40 and 53, respectively, are provided with upright flanges 67 and 69. These flanges are rigidly and detachably secured to flanges 71 and 73 which are of corresponding size and are rigid with the inlet sections 64 and 65 respectively. It is to be understood that all of the separators are similarly constructed in order that they may be readily detached for the purpose of affording access to the circulators which are connected thereto.

Other detachable supports for the separators are indicated at 101, 77, 79, and 95 in Fig. 2 of the drawings, the members 101 and 77 being detachably secured together at 97 and the members 79 and 95 similarly attached at 99.

It is further to be noted that the separators 38 and 39, and 46 and 47, are arranged so as to have their tangential inlets supplied by the same group of circulators. The combined discharge of the circulators of this group is divided in the inlet, a part tangentially entering one of the substantially contiguous separators, whereas the remaining part tangentially enters the other separator.

Of the separators indicated in Fig. 3 of the drawings, 51, 52, 58, and 59 are shown respectively connected to the outlet ends of the water wall risers 91–94, inc. These risers may connect with water wall headers, such as the header 100 shown in Fig. 1. This header is connected by furnace wall tubes 102 to a lower header 104 which has suitable connections for affording an adequate supply of water thereto. Similarly, the upper water wall header 106 at the opposite side of the furnace may be connected by suitable risers discharging into the drum 26 and tangentially connected to other separators. The header 106 is connected by the wall tubes 108 to an intermediate header 110 from which wall tubes 112 extend along the roof and one side of the primary furnace stage 10. These tubes connect at their lower ends to the header 114 from which floor tubes 116 extend to the header 118. Other wall tubes 120 and 122 connect the lower header 118 to the intermediate header 110.

The upper tubes of the bank of steam generating tubes have upright portions 140 connected to a header 142 which in turn is connected by circulators 144 to the drum 26. These upright portions 140 separate two parallel gas passes 150 and 152. In the latter, the superheater 154 is arranged while an economizer part 156 is disposed in the former. The remainder 158 of the economizer extends over both of the parallel gas passes.

Referring again to the steam and water separating equipment disclosed in this application, it may be considered as a multiple stage separator. In the first stage, steam and water separation takes place in a plurality of separating zones with which the steam and water circulators have direct and separate connections. In this stage, the steam and water separation may be referred to as forced separation caused by the centrifugal action within the separators (37-61) which cause the high velocity steam and water discharges to effect the separation, discharge the separated water from the individual zones of the first stage of separation, and co-operate with the other stages of the separation to prevent boiler operation under high water level conditions and at high capacities from interfering with the supply of dry steam.

The second stage of steam and water separation may be considered as represented by the corrugated plate separators 70 which are particularly indicated in Fig. 5 of the drawings. This multiple plate construction is effective to reduce steam velocity below a critical value by its flow straightening effect, so that no objectionable amount of water is entrained by the outgoing steam.

The third stage of steam and water separation takes place in the multiple plate separators 32 and 34, and in zones so related to the zones of the first and second stages of separation that steam from a plurality of zones of separation in the first and second stages passes to a single zone of third stage separation. In other words, a plurality of centrifugal separators are so arranged that steam separated therein passes to a third stage of separation common to a plurality of the centrifugal separators. Under some high boiler capacity conditions and high drum water level conditions, some water may pass from the primary and secondary stage of separation with the steam, and such water is separated out in the third stage.

The present invention also provides means for increasing the safe steaming capacity of a natural circulation steam boiler by minimizing the amount of steam carried down with the water from the drum to the steam generating tubes, and by increasing the amount of water received by them, through an increase in the boiler circulation rate.

By the use of the above described apparatus the discharges from the circulators are relieved of steam, and circulatory advantages are obtained because of the relatively higher density in the downcomers 28 over their full heights. The density of the fluid in these tubes is here compared with the density in the fluid in the uptakes or circulators 24, 24', etc.

The above described effects as to the relative densities in the downcomers 28 and in the uptakes 24, 24', etc., prevent the locally intense, heating parts of the steam generating tubes, incident to high capacity operation, from causing damage to those tubes by overheating.

While the invention has been described with reference to certain specific embodiments thereof, it is to be appreciated that it is not limited thereto, but is of a scope commensurate with the sub-joined claims.

What is claimed is:

1. Means for increasing the circulation rate in a water tube steam generator of the type in which the circulation rate is a function of the mean density differential between the fluid mixture in the risers and the fluid in the downcomers, said means comprising, in combination, a steam and water drum communicating with the risers and having its water space connected with the inlet ends of the downcomers, means establishing communication between the downcomers and the inlet ends of the risers, means including a wall forming the upright whirl chamber of a centrifugal steam and water separator within the drum, connection means including a whirl chamber inlet establishing direct communication between outlets of the risers and the whirl chambers and directing the high velocity fluid mixture discharge of the risers eccentrically into the whirl chamber to separate steam from the water before the latter enters the water space of the drum and the downcomers, said whirl chamber having an interior wall which is unobstructed in line with the steam and water inlet and at least to a position below the steam and water inlet, said whirl chamber means including a transverse whirl chamber baffle so constructed and arranged relative to the adjoining whirl chamber wall as to form at that position a restricted whirl chamber outlet for separated water, said restricted whirl chamber outlet being submerged and thereby having a fluid seal effected by separated water, the whirl chamber and its outlet being constructed and arranged to cause water entering the chamber at the inlet to flow through the outlet with a velocity head sufficient at least to balance the static head of the water in the drum when the drum water level is higher than the level of the entrance of the outlet, means forming a whirl chamber steam outlet in communication with the steam space of the drum, and a tubular drum connection through which steam passes from the steam space of the drum.

2. In a steam generator, a steam and water drum normally having a water level therein, a steam offtake leading from the steam space of the drum, means forming a vertically disposed cylindrically walled whirl chamber of a steam and water separator within the drum, said whirl chamber being disposed at least in part above said level, steam generating tubes, means directing steam and water eccentrically or tangentially into the whirl chamber at high velocity in such a way as to set up a whirling action of all of the steam and water in the whirl chamber, fluid confining means establishing direct communication between the steam generating tubes and the steam and water inlet means, said whirl chamber having an interior wall which is unobstructed in line with the steam and water inlet and at least to a position below the steam and water inlet, means including a restricted and liquid sealed whirl chamber outlet providing for the discharge of the separated water in a confined stream, outlet means beginning centrally of the top of the whirl chamber whereby separated steam may pass to the steam space of the drum, and means connecting the water space of the drum to the inlets of the steam generating tubes, the whirl chamber and its outlet being constructed and arranged to cause water entering the chamber at the inlet to flow through the outlet with a velocity head sufficient at least to balance the static head of the water in the drum when the drum water level is higher than the level of the entrance of the outlet.

3. In a boiler having a steam and water drum and a plurality of steam generating tubes connected to said drum, a centrifugal steam and water separator inside the drum and comprising a whirl chamber having a vertical axis, a tangential steam and water inlet at the upper part of said chamber, fluid confining means establishing direct communication between the steam generating tubes and the whirl chamber inlet so that the whirl chamber receives the unseparated steam and water mixture from the steam generating tubes at substantially the pressure of the mixture leaving the tubes to cause a whirling of the fluid within said chamber, said whirl chamber having an interior wall which is unobstructed in line with the steam and water inlet and at least to a position below the steam and water inlet, a steam outlet at the top of said chamber, and a restricted water outlet at the bottom of said chamber, constructed and arranged to cause water entering said chamber at said inlet to flow through said outlet with a velocity head sufficient at least to balance the static head of the water in the drum when the drum water level is higher than the level of the entrance to said outlet.

4. In a boiler having a steam and water drum and a plurality of steam generating tubes connected to said drum, a centrifugal steam and water separator inside the drum and comprising a whirl chamber having a vertical axis, a tangential steam and water inlet at the upper part of said chamber, fluid confining means establishing direct communication between the steam generating tubes and the whirl chamber inlet so that the whirl chamber receives the unseparated steam and water mixture from the steam generating tubes at substantially the pressure of the mixture leaving the tubes to cause a whirling of the fluid within said chamber, said whirl chamber having an interior wall which is unobstructed in line with the steam and water inlet and at least to a position below the steam and water inlet, a steam outlet at the top of said chamber, and a restricted water outlet at the bottom of said chamber, constructed and arranged to cause water entering said chamber at said inlet to flow through said outlet with a substantial continuation of the velocity of the water within said chamber.

5. In a boiler having a steam and water drum and a plurality of steam generating tubes connected to said drum, a centrifugal steam and water separator inside the drum and comprising a whirl chamber having a vertical axis, a tangential steam and water inlet at the upper part of said chamber, fluid confining means establishing direct communication between the steam generating tubes and the whirl chamber inlet so that the whirl chamber receives the unseparated steam and water mixture from the steam generating tubes at substantially the pressure of the mixture leaving the tubes to cause a whirling of the fluid within said chamber, a steam outlet at the top of said chamber, said whirl chamber having an interior wall which is unobstructed in line with the steam and water inlet and at least to a position below the steam and water inlet, a member at the bottom of said chamber spaced from the interior thereof to form an annular passage as the sole water outlet from said chamber, and vanes in said passage to direct the whirling water downwardly from said whirl chamber, said passage and said vanes therein being constructed and arranged to give the water passing out of said passage a velocity head sufficient at least to balance the static head of the water in the drum when the drum water level is higher than the level of the entrance to said passage.

6. In a boiler having a steam and water drum and a plurality of steam generating tubes connected to said drum, a centrifugal steam and water separator inside the drum and comprising the whirl chamber having a vertical axis and a bottom member forming the lower limit of the whirl space in said chamber, a restricted peripheral water outlet at the bottom of said chamber, a steam outlet at the top of said chamber, a tangential steam and water inlet at the upper part of said chamber, fluid confining means establishing direct communication between the steam generating tubes and the whirl chamber inlet so that the whirl chamber receives the unseparated steam and water mixture from the steam generating tubes at substantially the pressure of the mixture leaving the tubes and to cause a whirling of the fluid within said chamber, said inlet at the whirl chamber being relatively narrow and having its top adjacent the top of said chamber and its bottom below the middle of the height of the whirl space in said chamber and above and spaced from said bottom member, said whirl chamber having an interior wall which is unobstructed in line with the steam and water inlet and at least to a position below the inlet, the whirl chamber and its outlet constructed and arranged to cause water entering said chamber at said inlet to flow through said outlet with a velocity head sufficient at least to balance the static head of the water in the drum when the drum water level is higher than the level of the entrance to said outlet.

7. In a boiler having a steam and water drum and a plurality of steam generating tubes connected to said drum, a centrifugal steam and water separator inside the drum and comprising a whirl chamber having a vertical axis, a bottom member forming the lower limit of the whirl space in said chamber, a restricted peripheral water outlet in the form of a narrow annulus at the bottom of said chamber, a steam outlet at the top of said chamber, a tangential steam and water inlet at the upper part of said chamber, fluid confining means establishing direct communication between the steam generating tubes and the whirl chamber inlet so that the whirl chamber receives the unseparated steam and water mixture from the steam generating tubes at substantially the pressure of the mixture leaving the tubes and to cause a whirling of the fluid within said chamber, the interior wall of the whirl chamber being unobstructed at least to a position below the inlet, said inlet at the whirl chamber being relatively narrow and having its top adjacent the top of said whirl chamber and its bottom below the middle of the height of the whirl space in said chamber and above and spaced from said bottom member, said outlet being constructed and arranged to cause water entering said chamber through said inlet to flow through said outlet with a velocity head sufficient at least to balance the static head of the water in the drum when the drum water level is higher than the level of the entrance to said outlet.

8. In a boiler having a steam and water drum and a plurality of steam generating tubes connected to said drum, a centrifugal steam and water separator inside the drum and comprising a whirl chamber having a vertical axis, a tangential steam and water inlet hving its upper part adjacent the top of said whirl chamber, fluid confining means establishing direct communication between the steam generating tubes and the whirl chamber inlet so that the whirl chamber receives the unseparated steam and water mixture from the steam generating tubes at substantially the pressure of the mixture leaving the tubes and to cause a whirling of the fluid within said chamber, said whirl chamber having an interior wall which is unobstructed in line with the steam and water inlet and at least to a position below the steam and water inlet, a restricted water outlet at the bottom of said chamber, the whirl chamber and its outlet being constructed and arranged to cause water entering the chamber at the inlet to flow through the outlet with a velocity head sufficient at least to balance the static head of the water in the drum when the drum water level is higher than the level of the entrance of the outlet, said whirl chamber also having a relatively large opening in its top to form a steam outlet, and a plurality of upwardly-extending spaced plates forming a steam and water separator extending across said steam outlet with the lower edges of said plates adjacent said opening.

9. In a boiler having a steam and water drum and a plurality of steam generating tubes connected to said drum, a centrifugal steam and water separator inside the drum and comprising a whirl chamber having a vertical axis, a tangential steam and water inlet having its upper part adjacent the top of said whirl chamber, fluid confining means establishing direct communication between the steam generating tubes and the whirl chamber inlet so that the whirl chamber receives the unseparated steam and water mixture from the steam generating tubes at substantially the pressure of the mixture leaving the tubes and to cause a whirling of the fluid within said chamber, said whirl chamber having an interior wall which is unobstructed in line with the steam and water inlet and at least to a position below the steam and water inlet, a restricted water outlet at the bottom of said chamber, the whirl chamber and its outlet being constructed and arranged to cause water entering the chamber at the inlet to flow through the outlet with a velocity head sufficient at least to balance the static head of the water in the drum when the drum water level is higher than the level of the entrance of the outlet, said whirl chamber having an inwardly extending angular member with the opening therethrough relatively large to form a steam outlet, and a plurality of upwardly-extending spaced plates forming a steam and water separator extending across said steam outlet with the lower edges of said plates adjacent said opening.

WILL H. ROWAND.
JAMES FLETCHER.

CERTIFICATE OF CORRECTION.

Patent No. 2,289,970.   July 14, 1942.

WILL H. ROWAND, ET AL.

It is hereby certified that error appears in the printed specification of the above numbered patent requiring correction as follows: Page 3, first column, line 4, after "arranged" insert a comma; lines 69 and 70, for "intense, heating parts" read --intense heating of parts--; and second column, line 53, claim 2, before "means" insert --steam and water inlet--; page 4, second column, lines 12 and 13, claim 6, for "axis and a" read --axis, a--; and that the said Letters Patent should be read with this correction therein that the same may conform to the record of the case in the Patent Office.

Signed and sealed this 2nd day of February, A. D. 1943.

(Seal)

Henry Van Arsdale,
Acting Commissioner of Patents.